United States Patent
Dubois et al.

(10) Patent No.: US 11,421,096 B2
(45) Date of Patent: Aug. 23, 2022

(54) COMPOSITIONS COMPRISING VINYLIDENE FLUORIDE POLYMERS AND ADSORBENT CARBON MATERIALS

(71) Applicant: SOLVAY SA, Brussels (BE)

(72) Inventors: Eric Pierre Dubois, Wasseiges (BE); Anne-Lise Goffin, Oeudeghien (BE); Julien Jolly, Villenave d'Ornon (FR)

(73) Assignee: Solvay SA, Brussels (BE)

( * ) Notice: Subject to any disclaimer, the term of this patent is extended or adjusted under 35 U.S.C. 154(b) by 736 days.

(21) Appl. No.: 15/539,240

(22) PCT Filed: Dec. 21, 2015

(86) PCT No.: PCT/EP2015/080709
§ 371 (c)(1),
(2) Date: Jun. 23, 2017

(87) PCT Pub. No.: WO2016/102418
PCT Pub. Date: Jun. 30, 2016

(65) Prior Publication Data
US 2018/0085704 A1 Mar. 29, 2018

(30) Foreign Application Priority Data
Dec. 24, 2014 (EP) .................... 14307180

(51) Int. Cl.
*C08K 3/04* (2006.01)
*B01D 53/04* (2006.01)
(Continued)

(52) U.S. Cl.
CPC .......... *C08K 3/04* (2013.01); *B01D 53/0462* (2013.01); *C08F 214/225* (2013.01);
(Continued)

(58) Field of Classification Search
CPC ...... C08F 214/225; C08F 220/18; C08K 3/04; C08L 27/08; C08L 27/16; C08L 33/08; C08L 33/10
(Continued)

(56) References Cited

U.S. PATENT DOCUMENTS

| | | |
|---|---|---|
| 3,516,791 A | 6/1970 | Brian |
| 4,861,851 A | 8/1989 | Miyabayashi |

(Continued)

FOREIGN PATENT DOCUMENTS

| | | |
|---|---|---|
| EP | 2429020 A1 | 3/2012 |
| WO | 2001057095 A1 | 8/2001 |

(Continued)

OTHER PUBLICATIONS

Yamashita et al. "Activated carbon fibers and films derived from poly(vinylidene fluoride)" Carbon, vol. 39, Issue 2, Feb. 2001, pp. 207-214 (Year: 2001).*

(Continued)

*Primary Examiner* — Colin W. Slifka
(74) *Attorney, Agent, or Firm* — Osha Bergman Watanabe & Burton LLP (57) ABSTRACT

Composition comprising a) a polymer comprising recurring units derived from vinylidene fluoride monomer and at least one monomer carrying at least one functional group selected from carboxyl groups, ester groups and hydroxyl groups, and b) a microporous adsorbent carbon material having a specific surface area (BET) of at least 700 m²/g, a pore volume in the range of from 0.1 to 0.7 m³/g, at least 60% of said pore volume being formed by micropores having a pore radius of 2 nm or less.

17 Claims, 1 Drawing Sheet

(51) Int. Cl.
*C08F 214/22* (2006.01)
*C08L 27/08* (2006.01)
*C08L 27/16* (2006.01)
*C08L 33/08* (2006.01)
*C08L 33/10* (2006.01)

(52) U.S. Cl.
CPC ............... *C08L 27/08* (2013.01); *C08L 27/16* (2013.01); *C08L 33/08* (2013.01); *C08L 33/10* (2013.01); *B01D 2253/202* (2013.01); *B01D 2257/504* (2013.01); *Y02C 20/40* (2020.08)

(58) Field of Classification Search
USPC ........................................................ 502/402
See application file for complete search history.

(56) References Cited

U.S. PATENT DOCUMENTS

| | | | | |
|---|---|---|---|---|
| 7,964,530 B2 * | 6/2011 | Nanba | ................... | H01G 11/86 502/416 |
| 8,337,725 B2 * | 12/2012 | Abusleme | .............. | B01D 69/02 252/511 |
| 2003/0049519 A1 | 3/2003 | Ishida | | |
| 2013/0152787 A1 | 6/2013 | Boulet | | |

FOREIGN PATENT DOCUMENTS

| | | |
|---|---|---|
| WO | 2008129041 A1 | 10/2008 |
| WO | 2012106218 A2 | 8/2012 |
| WO | 2012126018 A1 | 9/2012 |
| WO | 2014059392 A1 | 4/2014 |

OTHER PUBLICATIONS

Barton S. et al. "Thermal and chemical dehydrohalogenation of spray power", Org. Coatings Plastics Reprints [Paper presented at Los Angeles meeting—ACS 1961st meeting, Mar.-Apr. 1971] (1971) vol. 31, No. 1, pp. 176-188.

* cited by examiner

COMPOSITIONS COMPRISING VINYLIDENE FLUORIDE POLYMERS AND ADSORBENT CARBON MATERIALS

CROSS REFERENCE TO A RELATED APPLICATION

This application is a U.S. national stage entry under 35 U.S.C. § 371 of International Application No. PCT/EP2015/080709 filed Dec. 21, 2015, which claims priority to European application No. 14307180.1 filed on Dec. 24, 2014. The entire contents of these applications are explicitly incorporated herein by this reference.

BACKGROUND OF THE INVENTION

The present invention relates to compositions comprising fluorinated polymers and adsorbent carbon materials and to the use of such compositions for gas separation applications.

PRIOR ART

Gas separation by adsorption methods are known in the art for use in multi-component fluid mixtures and in particular in gas mixtures.

Gas separation by adsorption basically relies on the preferential adsorption of one component of a fluid mixture on an insoluble material to separate this component from the remaining components of the fluid mixture and the subsequent regeneration of the adsorbent material to dissolve the adsorbed component thereby allowing the reuse of the adsorbent material.

In recent years there has also been an increasing interest to develop fluid storage systems for different fields such as energy applications or for environmental purposes. One of the technologies that has been proposed for these fluid storage applications is the use of porous materials having high adsorption capacity. The fluid to be separated is accumulated in the porosity of these materials due to the attractive forces that are established between the fluid molecules and the adsorbent materials.

Several types of adsorbents have been developed and tested and the best candidates are materials with a high development of pores with suitable size to allow the fluid molecules to be adsorbed to enter into the pores.

To achieve a satisfactory degree of adsorption and stability of the entire set-up it is advantageous if the adsorbent material is provided on a support through which the fluid medium containing the fluid to be separated or to be stored flows and thereby the adsorbent material adsorbs the fluid from the fluid stream which leaves the adsorbent material depleted of the fluid to be separated or stored. Accordingly, the development of suitable binders which enable the attachment or fixation of the adsorbent material on a suitable carrier is also of interest.

Public concerns over the climate change due to greenhouse gas emissions and an accelerated increase of carbon dioxide concentration in the atmosphere have led to an increased need for efficient technologies to capture carbon dioxide from fluid or gas streams. In particular fossil fueled power plants emit a significant amount of carbon dioxide during operation and the carbon dioxide capture from the fuel gas stream is also of particular interest.

Fluorinated polymers have been described in the literature in a great variety for different purposes, including inter alia as binder in batteries for the manufacture of membranes. In this regard fluorinated polymers or copolymers comprising recurring units derived from hydrophilic or functional monomers to modify the properties of fluorinated polymer have been developed, for example to improve the adhesion of these materials towards metals.

WO 2008/129,041 is directed to certain vinylidene fluoride copolymers obtained by copolymerizing vinylidene fluoride monomers and hydrophilic (meth) acrylic monomers.

U.S. Pat. No. 4,861,851 discloses substantially random vinylidene fluoride acrylic acid ester copolymers comprising at least one unit selected from alkyl acrylate and alkoxy-substituted alkyl acrylate.

WO 01/57,095 discloses linear fluorinated polymers comprising fluorocarbon and hydrocarbon repeat units, the fluorocarbon units being derived from tetrafluoroethylene, chlorotrifluoroethylene, trifluoroethylene, vinyl fluoride or vinylidene fluoride and the hydrocarbon units being derived from vinyl acetate, vinyl alcohol, (meth)acrylic acid, acrylates or methacrylates.

So called activated carbon has been described in the literature as suitable adsorbent material for separating gases or purification of fluid streams by adsorption methods. Said respective materials can be designed in terms of porosity, pore size and pore size distribution to be adopted to a particular intended application.

WO 2012/126,018 discloses carbon-based adsorbent materials having a utility for carbon dioxide capture.

US 2013/152,787 discloses a method of adsorptive gas separation where a so-called temperature swing adsorption method is provided for separating a fluid mixture comprising at least two different fluid components. The method comprises an initial step of admitting the fluid mixture or feed mixture to enter a channel where the adsorbent material is provided thereby allowing the adsorption of one of the components of the fluid mixture onto the adsorbent. To dissolve the adsorbed material again, a temperature increase is used which has given the method of temperature swing adsorption its name. Instead of temperature increase there are also methods known using a pressure change in the system to dissolve the adsorbed material and the respective methods are known as so-called pressure swing adsorption methods.

OBJECT OF THE INVENTION

A first object of the present invention is to provide certain compositions comprising a fluorinated polymer and a carbon material embedded in a matrix of said fluorinated polymer which may be used for gas separation or gas purification through adsorption methods.

Another object of the present invention is the use of compositions comprising a fluorinated polymer and a carbon material embedded in a matrix of said fluorinated polymer for use in gas separation or gas purification through adsorption methods.

Further embodiments of the present invention relate to slurries or dispersions comprising fluorinated polymers and adsorbent carbon materials useful as coating compositions on surfaces or substrates.

DESCRIPTION OF THE INVENTION

The aforementioned objects of the present invention have been achieved by the compositions as claimed in claim 1, by the slurries or dispersions in accordance with claim 7 and by the use of the compositions in accordance with claim 11.

Preferred embodiments of the present invention are set forth in the dependent claims and in more detail in the specification hereinafter.

The compositions in accordance with the present invention comprise as component a) a polymer comprising recurring units derived from a vinylidene fluoride monomer (hereinafter VDF monomer) and at least one monomer carrying at least one functional group selected from carboxyl groups, ester groups and hydroxyl groups.

The amount of recurring units derived from the monomer carrying at least one functional group is preferably in the range of from 0.02 to 20, more preferably in the range of from 0.5 to 10 mol %, based on the total amount of recurring units in the polymer. Especially preferably the amount is at most 7.5 mol % and more preferably at most 5 mol %.

In accordance with a preferred embodiment, a fraction of at least 30, preferably at least 40, even more preferably at least 50%, 60% or 70% of the recurring units derived from the monomer carrying at least one functional group selected from carboxyl groups, ester groups and hydroxyl groups is randomly distributed throughout the polymer chain.

The expression "fraction of randomly distributed units" is intended to denote the percent ratio between the average number of sequences of monomers with functional groups, said sequences being comprised between two recurring units derived from VDF monomer and the total average number of recurring units of said monomer with functional groups. If each recurring units of monomers with functional groups is isolated, i.e. located between two recurring units of the VDF monomer, the average number of sequences of said monomer with functional groups equals the average total number of recurring units of the monomer with functional groups and the fraction of randomly distributed units is 100%. This represents a perfectly alternating structure (random distribution). The larger the number of isolated units with respect to the total number of units, the higher will be the percentage value of the fraction of randomly distributed units.

The determination of the total average number of units of monomers with functional groups in the polymer a) in the compositions according to the present invention can be performed by any suitable method known to the skilled person. Mention can be made of acid-base titration methods, of NMR methods, particularly adequate for the quantification of respective monomers comprising aliphatic hydrogen atoms in side chains, and weight balance based on total fed monomer and unreacted residual monomer during the polymer manufacture.

The average number of sequences of monomers with functional groups may be determined by $^{19}$F-NMR using methods known to the skilled person.

In accordance with still another preferred embodiment the polymers a) in the compositions in accordance with the present invention are semi-crystalline. The term semi-crystalline in this regard is intended to denote a polymer which possesses a detectable melting point. It is generally understood that semi-crystalline polymers possess a heat of fusion, determined in accordance with ASTM D3418 of advantageously at least 0.4 J/g and more preferably more than 1 J/g. Such polymers offer certain advantages over amorphous polymers, in particular improved mechanical properties without additional cross-linking being necessary.

Polymers a) with a heat of fusion of 30 J/g to 60 J/g, preferably from 35 to 55 J/g and even more preferably 40 to 50 J/g have been found particularly advantageous in certain applications.

Preferably, polymer a) possesses a good thermal resistance and undergoes a weight loss of 1 wt %, measured by thermal gravimetric analysis (TGA) in accordance with ISO 11358, at a temperature of more than 350° C., preferably more than 360° C. and even more preferably more than 380° C.

Linear copolymers, i.e. polymers composed of macromolecules made of substantially linear sequences of recurring units of the monomers are preferred over graft copolymers or comb-like polymers, where monomers are grafted onto a main chain.

The polymers a) preferably have an intrinsic viscosity of above 0.1 dl/g and at most 20 dl/g, preferably in the range of 0.2-15 dl/g, more preferably in the range of from 0.5 to 10.0 dl/g.

The term VDF monomer, as used herein, includes, in addition to vinylidene fluoride itself, monomers conventionally used for copolymerization with vinylidene fluoride, such as vinyl fluoride, trifluoroethylene, trifluorochloroethylene, tetrafluoroethylene, hexafluoropropylene, and fluoroalkyl vinyl ethers. It is generally preferred however, that the molar amount of vinylidene fluoride, based on the entire amount of VDF monomers is at least 60, preferably at least 70 and especially preferably at least 80 mol % to ensure the desirable property spectrum of the polymer, in particular with regard to chemical resistance and heat resistance.

The monomer carrying at least one functional group selected from carboxyl groups, ester groups and hydroxyl groups can be principally selected from any suitable compound comprising a polymerizable double bond and a functional group as required.

Preferred monomers b) are hydrophilic monomers of general formula I (1)

wherein $R_1$ to $R_3$, which may be the same or different, are independently a hydrogen atom or a $C_1$-$C_6$, preferably $C_1$-$C_3$ alkyl group and $R_4$ is a hydrogen atom or a $C_1$-$C_6$ hydrocarbon moiety comprising at least one hydroxyl group.

Preferred monomers with functional groups are acrylic acid, methacrylic acid, hydroxyethyl(meth)acrylate, hydroxypropyl(meth)acrylate hydroxyethylacrylate and hydroxyethylhexyl(meth)acrylate.

The foregoing preferred polymers a) in the composition of the present invention are described in more detail in WO 2008/129041, which also describes the synthesis of respective products in more detail.

This process comprises polymerizing in an aqueous medium, in the presence of a radical initiator, the VDF monomer and the monomer comprising the functional group in a reaction vessel wherein an aqueous solution comprising the monomer with the functional groups is continuously fed and the pressure in the reaction vessel is kept at a value exceeding the critical pressure of the VDF monomer. It is preferable to keep the pressure in the course of the whole polymerization above the critical pressure of the VDF monomer or VDF monomer mixture, which means that generally the reaction is carried out at pressures usually above 5 MPa, preferably above 7.5 MPa and even more preferably above 10 MPa. It is also preferable to continue the feeding of the monomer with functional groups during the entire duration of the polymerization.

By combining these two conditions, the fraction of randomly distributed units of the monomer with the functional groups can be maximized; ideally a nearly statistical distribution of the monomer with the functional groups may be obtained.

Another group of vinylidene fluoride polymers suitable as component a in the compositions of the present invention is described in WO 01/57095 to the extent the polymers described therein comprise a VDF monomer as described above, preferably in an amount of at least 50%.

This reference generally describes linear copolymers comprising a fluorocarbon repeat unit selected i.a. from VDF monomers as defined above and hydrocarbon repeat units selected from the group consisting of vinyl acetate, vinyl alcohol, acrylic acid, acrylates and methacrylates.

A preferred process for the manufacture is also described in this reference wherein the monomers and an initiator are mixed in a polymerization medium comprising liquid or supercritical carbon dioxide. As a result of such a process, more blocky structures are obtained compared to the products in accordance with WO 2008/129041. For further details reference is made to WO 01/57095.

Suitable components a) for use in the compositions of the present invention are commercially available form a series of suppliers. The Solef® grades available from Solvay SA may be mentioned here as one example.

The compositions in accordance with the present invention comprise as component b) a microporous adsorbent carbon material having a specific surface area (BET) of at least 700 m$^2$/g, a pore volume in the range of from 0.1 to 0.7 ml/g, at least 60% of said pore volume being formed by micropores having a pore radius of 2 nm or less.

In principle any adsorbent carbon material fulfilling the specification given above can be used in the compositions in accordance with the present invention and the skilled person will select the best suitable materials based on his professional knowledge and the requirements of the specific situation.

Non-graphitizing carbon materials are preferred as component b) in the compositions in accordance with the present invention. Non-graphitizing carbons show no marked development of graphite structure after heat treatment at high temperatures above 3000° C., even near the melting point of carbon (about 3400° C.). The non-graphitizing nature of these materials is believed to be caused by their nanotexture, which is characterized by a random orientation of carbon layers. The fundamental structural characteristics are anisotropic hexagonal carbon layers, the random orientation of which results in the formation of minute pores, which is in sharp contrast to highly-oriented graphites with a high degree of planar orientation and a dense nanotexture.

Shortly said, non-graphitizing carbon materials resemble graphite in that they are sp$^2$ hybridized carbon but unlike graphite there is no long-range order and the materials are considered amorphous or disordered.

Non-graphitizing carbons are usually obtained through the pyrolysis of suitable precursors such as sugars or polymeric resins. Through appropriate selection of the precursor material and control of the pyrolysis conditions the pore structure of non-graphitizing carbon material can be tailored and adjusted and the skilled person is aware of respective processes to adjust the specific surface area, pore volume and pore radius as needed for the compositions in accordance with the present invention. Respective materials are also commercially available, e.g. various grades of carbon materials available form ATMI Inc. under the tradename Brightblack®.

A preferred precursor material suitable for the manufacture of adsorbent carbon materials b) in the compositions in accordance with the present invention are chlorinated vinyl polymers.

The term "chlorinated vinyl polymer" is understood to denote a homopolymer of one chlorinated vinyl monomer, or a copolymer which two or more chlorinated vinyl monomers form with one another or which one or more chlorinated vinyl monomers form with one or more ethylenically unsaturated monomers other than a chlorinated vinyl monomer, such as halogenated vinyl monomers other than chlorinated vinyl monomers, olefins, acrylic esters, methacrylic esters, acrylonitriles, methacrylonitriles, acrylamides and methacrylamides, and vinyl esters (such as vinyl acetate).

The term "chlorinated vinyl monomer" is understood to denote an ethylenically unsaturated monomer comprising one or more chlorine atoms and not comprising a heteroatom other than the chlorine atom(s). Mention may be made, as examples of chlorinated vinyl monomers, of vinyl chloride, vinylidene chloride, trichloroethylene and chloroprene. Among chlorinated vinyl monomers, vinyl chloride, vinylidene chloride and mixtures thereof are preferred.

The term "halogenated vinyl monomer" is understood to denote an ethylenically unsaturated monomer comprising one or more identical or different halogen atoms and not comprising a heteroatom other than the halogen atom(s). Mention may be made, as examples of halogenated vinyl monomers other than chlorinated vinyl monomers, of fluorine-comprising monomers (such as trichlorofluoroethylene, dichlorodifluoroethylene, chlorotrifluoroethylene and fluorinated vinyl monomers like vinylidene fluoride) and of bromine-comprising monomers (such as dichlorodibromoethylene and brominated vinyl monomers such as vinyl bromide and vinylidene bromide).

Chlorinated vinyl polymers useful for the present invention comprise advantageously more than 50 mol %, preferably more than 80 mol % and still more preferably more than 90 mol % of repeat units derived from one or more chlorinated vinyl monomers.

The polymer used as precursor for component b) in the compositions in accordance with the present invention is preferably chosen from vinyl chloride polymers, vinylidene chloride polymers and mixtures thereof.

The term "vinyl chloride polymer" is understood to denote a homopolymer of vinyl chloride or a copolymer which vinyl chloride forms with one or more other ethylenically unsaturated monomers, such as chlorinated monomers other than vinyl chloride (like vinylidene chloride), chlorine-comprising halogenated vinyl monomers comprising one or more halogen atoms other than chlorine (such as one or more one or more fluorine atoms and/or one or more bromine atoms), chlorine-free halogenated vinyl monomers (such as vinylidene fluoride), olefins, acrylic esters, methacrylic esters, acrylonitriles, methacrylonitriles, acrylamides and methacrylamides, and vinyl esters (such as vinyl acetate).

Vinyl chloride polymers useful as precursors for the compositions of the present invention comprise advantageously at least 50 mol %, preferably more than 80 mol % and still more preferably more than 90 mol % of repeat units derived from vinyl chloride.

Suitable vinyl chloride polymers can be prepared by any process known to the skilled person. In a certain preferred embodiment, the preparation process includes an aqueous emulsion polymerization step followed by a spray-drying step; said spray-drying step is then optionally followed by a milling and/or classifying step (e.g. using a fluidized bed). In another preferred embodiment, the preparation process includes an aqueous suspension polymerization step followed by a spinning step.

The polymer used as precursor for component b) is more preferably a vinylidene chloride polymer.

The term "vinylidene chloride polymer" is understood to denote a homopolymer of vinylidene chloride, or a copolymer which vinylidene chloride forms with one or more other ethylenically unsaturated monomers, such as chlorinated monomers other than vinylidene chloride (like vinyl chloride), chlorine-comprising halogenated vinyl monomers comprising one or more halogen atoms other than chlorine (in particular, chlorine- and fluorine-containing halogenated vinyl monomers like trichlorofluoroethylene, dichlorodifluoroethylene, chlorotrifluoroethylene), chlorine-free halogenated vinyl monomers (such as vinylidene fluoride), olefins, acrylic esters, methacrylic esters, acrylonitriles, methacrylonitriles, acrylamides and methacrylamides, and vinyl esters (such as vinyl acetate).

Vinylidene chloride polymers useful as precursor for component b) in the compositions of the present invention comprise advantageously more than 50 mol %, preferably more than 80 mol % and still more preferably more than 90 mol % of repeat units derived from vinylidene chloride.

Suitable vinylidene chloride polymers can be prepared by any process known to the skilled person. The preparation process includes preferably an aqueous suspension polymerization step followed by a spinning step.

Vinylidene chloride polymers are often generally referred to as Saran polymers and carbon materials obtained through pyrolysis of these polymers are often referred to as Saran carbons. The conditions for the pyrolysis of other chlorinated vinyl polymers are similar to the conditions used for Saran polymers and the skilled person is aware of suitable processes.

Vinylidene chloride polymers can be pyrolyzed respectively carbonized by heating to temperatures of at least 700° C. in an inert atmosphere. An inert atmosphere may be obtained by carrying out the pyrolysis in a gas which does not react with the polymer to by pyrolyzed during the conditions of the pyrolysis. The skilled person is aware of suitable gases for that purpose and will select the best suited gas based on his professional knowledge. Just by way of example, nitrogen, carbon dioxide or the noble gases like He, Ar, Kr or Xe may be mentioned here as suitable gases.

The thermally induced dehydrochlorination reaction in this case gives a quantitative yield of carbon and gaseous hydrogen chloride if the heating rate is low. The resulting carbon is free from all impurities except for traces of chlorine. This is an advantage over pyrolysis products from other organic materials like cellulosics or the like where the degree of impurities is higher.

In accordance with a preferred process for the carbonization of chlorinated vinyl polymers, the polymer is in a first step degraded at a temperature below its melting point to an infusible char which is then heated further at high temperatures to complete dehydrochlorination. This process gives good control over the surface area and the pore size of the resulting carbon.

Another method involves heating at a fairly high rate until a temperature is reached where the dehydrochlorination is complete. In this case the polymer melts before any significant degradation occurs. Once the HCl gas begins to evolve, it causes the melt to foam. Generally, this process yields larger pores than the process described before and thus careful control is necessary to achieve the small pores required for component b) in the compositions in accordance with the present invention.

The pyrolysis of vinylidene chloride polymer as representative examples includes at least four basic reactions.

The first reaction is a primary dehydrochlorination to polychloroacetylene

This reaction takes place in the solid state at temperatures in the range of from 160 to 190° C. and approximately one half of the hydrogen chloride is lost in this reaction. Reactions 2 and 3 depicted below may also occur at the higher end of this temperature range to a certain extent but if the temperature is not further increased the dehydrochlorination rate drops to zero. The total amount eliminated depends on the temperature but does not usually exceed 60% at 190° C.

Reactions 2 and 3 are a Diels-Alder condensation between conjugated sequences and a subsequent aromatization of the Diels-Alder condensation product:

The Diels alder reaction usually proceeds at a high rate at temperatures in the range of from 250° C. to 350° C. The initial ring formation of reaction 2 (shown as the first reaction in the scheme above) is immediately followed by reaction 3. The tendency to aromatize at these temperatures is pretty strong. About one third of the hydrogen chloride is lost in reaction 3 and one sixth is lost in the final step which follows reaction 3.

The final step is the completion of the dehydrochlorination (i.e. elimination of one more molecule of HCl from the product of reaction 3) to form the carbon with $sp^2$-hybridized carbon atoms. To achieve this the reaction has to be increased even further to 600-700° C.

In the first process referred to above with a slow heating rate the initial reaction is carried out and basically completed before the aromatization reaction. Rapid heating, on the other hand allows the initial dehydrochlorination and aromatization to occur simultaneously.

The various reactions that occur have induction periods and different activation energies and thus the morphology of the product can be controlled by appropriate selection of heating rate and residence time at a certain temperature.

In some cases it has been shown that it is sufficient to achieve a dehydrochlorination in the range of from 10 to 20% below 190° C. to freeze the structure and morphology. Once this level is reached at a low temperature, the char can be heated rapidly up to the final temperature without altering the morphology obtained in the first step.

In some cases the following temperature profile for the pyrolysis has proved to yield the best results:

Heating from room temperature to a temperature in the range of from 160 to 190° C. (e.g. 175° C.) at a temperature increase rate of 5-20° C./min (e.g. 10° C./min) and keeping at this temperature for 6 to 48 hours (e.g. about 16 h), thereafter heating from 175° C. to 600° C. at a temperature increase rate of 5-20° C./min (e.g. 10° C./min) and keeping at 600° C. for about 30 minutes to 6 hours (e.g. 1 hour).

For the subsequent cooling no specific temperature control is usually necessary.

Chemical processes for the carbonization of chlorinated vinyl polymers have also been described in the literature. Thus, the use of potassium amide in liquid ammonia to effect the dehydrochlorination has been described in U.S. Pat. No. 3,516,791 to which reference is made for further details.

Barton et al, Org. Coatings Plastics Preprints 31, 786 (1971) used alcoholic potassium hydroxide. Normally the polymers obtained thereby contain significant amounts of oxygen, however, which may have some negative impact for the intended use.

Thus, pyrolysis methods are generally preferred over chemical methods.

The carbon material after pyrolysis may, if needed, be milled to obtain smaller particles. Suitable milling processes and devices are known to the skilled person.

Materials suitable as component b) are to a certain degree commercially available, e.g. certain Brightblack® carbon types available from ATMI.

Furthermore, suitable carbon pyrolyzate adsorbents are disclosed in WO 2012/106218 and in WO 2014/059392, to which reference is made for further details.

These materials can be used as such or may be subjected to a milling or grinding process prior to use to reduce the particle size.

The average particle diameter of the product obtained directly after pyrolysis is usually in the range of from 50 to 500 μm, preferably in the range of from 100 to 300 μm and after milling or other adequate treatment to reduce the particle size weight average particle diameters in the range of from 1 to 30 μm, preferably of from 2 to 20 μm are obtained.

Real systems are practically always polydisperse, which means that the particles in an ensemble have different sizes. The notion of particle size distribution reflects this polydispersity.

The term average particle diameter when used herein refers to the D50 median diameter computed on the basis of the intensity weighed particle size distribution as obtained by the so called Contin data inversion algorithm. Generally said, the D50 divides the intensity weighed size distribution into two equal parts, one with sizes smaller than D50 and one with sizes larger than D50.

In general the average particle diameter as defined above is determined according to the following procedure. First, if needed, the particles are isolated from a medium in which they may be contained (as there are various processes for the manufacture of such particles, the products may be available in different forms, e.g. as neat dry particles or as a suspension in a suitable dispersion medium). The neat particles are then used for the determination of the particle size distribution preferably by the method of dynamic light scattering. In this regard the method as described in ISO Norm "Particles size analysis—Dynamic Light Scattering (DLS)", ISO 22412:2008(E) is recommended to be followed. This norm provides i.a. for instructions relating to instrument location (section 8.1.), system qualification (section 10), sample requirements (section 8.2.), measurement procedure (section 9 points 1 to 5 and 7) and repeatability (section 11). Measurement temperature is usually at 25 ° C. and the refractive indices and the viscosity coefficient of the respective dispersion medium used should be known with an accuracy of at least 0.1%. After appropriate temperature equilibration the cell position should be adjusted for optimal scattered light signal according to the system software. Before starting the collection of the time autocorrelation function the time averaged intensity scattered by the sample is recorded 5 times. In order to eliminate possible signals of dust particles moving fortuitously through the measuring volume an intensity threshold of 1.10 times the average of the five measurements of the average scattered intensity may be set. The primary laser source attenuator is normally adjusted by the system software and preferably adjusted in the range of about 10,000 cps. Subsequent measurements of the time autocorrelation functions during which the average intensity threshold set as above is exceeded should be disregarded.

Usually a measurement consists of a suitable number of collections of the autocorrelation function (e.g. a set of 200 collections) of a typical duration of a few seconds each and accepted by the system in accordance with the threshold criterion explained above. Data analysis is then carried out on the whole set of recordings of the time autocorrelation function by use of the Contin algorithm available as a software package, which is normally included in the equipment manufacturer's software package.

The microporous adsorbent carbon material b) in the compositions according to the present invention have a specific surface area according to BET of at least 700 $m^2/g$, preferably of at least 800 $m^2/g$ and even more preferable of 900 $m^2/g$ or more. Furthermore, the adsorbent material may have a maximum specific surface area of 1800 $m^2/g$ or less, preferably of 1600 $m^2/g$ or less and even more preferably of 1300 $m^2/g$ or less. Thus preferred ranges for the specific surface area are 700-1800 $m^2/g$, preferably 800 to 1600 $m^2/g$ and even more preferably 900 to 1300 $m^2/g$.

The BET specific surface area is determined by gas adsorption , e.g. on a ASAS2020 equipment of Micromeritics. Prior to the analysis the samples are pre-treated under vacuum at 110° C. for 16 hours and the measurements are performed using nitrogen as adsorptive gas at a temperature of 77 K by the volumetric method in accordance with ISO 9277:2010 (Determination of the specific surface area of solids by gas adsorption—BET method). Annex C of ISO 9277:2010 standard describes a method which allows to define a relative range of pressures for which the BET theory is applicable for the specific surface area of microporous samples. This method requires drawing the graph of na(1−P/Po) where na is the specific adsorbed quantity and P/Po is the relative pressure.

The method is based on the determination of the adsorbed or used amount of nitrogen necessary to cover the outer surface and the accessible inner pore surface of a solid with a monolayer of nitrogen. This so called monolayer capacity is calculated using the adsorption isotherm na=f(P/P0) using the BET equation.

To determine the adsorption isotherm, nitrogen is step-wise added to the sample (which has been degassed by heating under vacuum) held at a constant temperature. The specific amount na of nitrogen adsorbed (in moles/g) is calculated using the respective difference between the dosing pressure and the equilibrium pressure in each dosing step and plotting the values against the relative pressure P/Po.

The multiple point determination method uses five points equal to or lower than the maximum P/Po value for which the linear relationship to na(1−P/Po) is fulfilled.

For microporous materials as in the present case the range of relative pressure P/Po has to be selected in such a manner than na(1−P/Po) shows a continuously increasing value with increasing P/Po, i.e. the upper limit of the range can be taken from the maximum of na(1−P/Po). In this range the fitted linear BET-graph must have a positive ordinate value to obtain a positive value for the BET-parameter CBET. Finally, the relative pressure value assigned to the specific monolayer capacity has to be within the range P/Po as defined before.

According to the ISO norm, the lower value of the range is usually about P/Po=0.001 and the upper value is usually P/Po=0.3 at maximum.

The pore volume of the adsorbent material is in the range of from 0.1 to 0.7 ml/g, preferably in the range of from 0.15 to 0.6 ml/g and even more preferably in the range of from 0.2 to 0.55 ml/g.

The pore volume of the component b) in the compositions of the present invention is calculated from the amount of nitrogen adsorbed at P/Po close to unity or before the liquid condensation (at the plateau).

At least 60% of the total pore volume of the adsorbent material is formed by micropores having a radius of 2 nm or less. Preferably, at least 70% and even more preferably at least 80% of the total pore volume is formed by pores with a radius of 2 nm or less.

The pore size distribution is determined in accordance with ISO 15901-3:2007 (Pore size distribution and porosity of solid materials by mercury porosimetry and gas adsorption—Part 3: analysis of micropores by gas adsorption).

Mercury porosimetry is a widely accepted method for determining total volume and pore size distribution. The method is based on the fact that a non-wetting liquid requires that a positive hydrostatic pressure be applied to enable it to enter pores of radius r. The hydrostatic pressure varies inversely with the pore radius r. The behaviour of a non-wetting liquid in a porous sample is usually described with the Washburn equation, which is directly applicable with mercury as mercury is one of the few liquids which is suitable for porosimetry measurements. Mercury does not wet most porous materials and will not penetrate pores by capillary action. Liquid mercury has a high surface tension, i.e. molecular forces in its surface film tend to contract its volume into a form with the least surface area (which is a spherical form). Consequently, entry of mercury into pores requires applying pressure in inverse proportion to the opening size.

To measure the pore volume or the pore size distribution, a weighed sample is enclosed in a stout bomb (penetrometer) and evacuated to remove air from the pores. Mercury is then admitted to fill the cell and surround the sample and is subjected to progressively higher pressures applied hydraulically. At each pressure P, the corresponding volume of mercury contained in the cell is measured.

It is assumed that as the pressure is increased, mercury enters the pores in decreasing order of size. Thus, if ΔV is the volume intruded between P and P+ΔP, it will equal the volume of pores with radii between r and r−Δr with r being calculated in accordance with the Washburn equation $$r = 2\sigma \cos \theta / P$$

σ is assumed to be the value for pure mercury, 484 mN/m and the contact angle θ has to be measured prior to the analysis. If the value of the contact angle is not known, a value of 140° is assumed (usual for activated carbons).

The pressure is varied in a range of from 3.44 kPa to 4.13 MPa which, at the assumed contact angle, corresponds to a pore radius between appr. 225 μm and appr. 1.7 nm.

The radius r is to be regarded not as a literal pore dimension, but rather as the size of an equivalent cylindrical pore that would be filled at the given pressure. This means that the pore data obtained by the method have to be understood as equivalent cylindrical dimensions if the pores have geometrical shapes of different non-circular cylindrical form, which is often the case.

The weight ratio of component a) to component b) in the compositions in accordance with the present invention is not particularly critical and may be e.g. in the range of from 2:98 to 98:2, preferably in the range of from 5:96 to 95:5.

In accordance with a preferred embodiment of the present invention, the weight percentage of component b) is at least 50, preferably at least 60, 70, 80, 90, 95, 96, 97, 98 or 99%, based on the combined weight of components a) and b).

Another embodiment of the present invention relates to slurries or liquid dispersions comprising the compositions described hereinbefore. Said slurries or dispersions, besides the compositions described hereinbefore comprise an aqueous or organic solvent or mixtures thereof.

The solvent is not particularly critical and will be selected by the skilled person in accordance with the needs of the specific intended application.

In many cases, an aqueous solvent, in particular water, may be used.

In accordance with a preferred embodiment a coatable slurry comprising the compositions of the present invention can be obtained by diluting a latex of component a) with water to reach a concentration in the range of from 0.5 to 5 wt % and adding component b) under mechanical stirring. The slurry thus obtained may be directly used for the coating of surfaces or may be used to prepare a casting composition, which may be casted on the surface to be coated.

Accordingly, the slurries or dispersions in accordance with the present invention may be used for the manufacture of casting compositions, i.e. compositions which can be casted onto surfaces to obtain a coating of the compositions of the present invention on the surface on which the casting solution is casted.

Besides the slurries or dispersions of the present invention, the casting composition may contain other auxiliaries conventionally used in casting processes in which the coating of surfaces is achieved. The skilled person will select the appropriate additives based on his professional knowledge and the specific intended application.

Another aspect of the present invention relates to adsorbent systems comprising a substrate material comprising a surface coating obtained by casting a casting composition onto the surface of the substrate material and subsequent removal of the solvent. Again, the selection of the substrate is not of critical importance and will be made based by the skilled person based on his professional knowledge and the intended use.

The compositions, slurries, dispersions or casting compositions in accordance with the present invention may preferably be used in processes for the separation of a component of a fluid mixture from other components in said fluid mixture.

The term fluid, as used herein, encompasses liquids as well as gases and generally denotes substances which show a limited viscosity, i.e. the possibility to flow under shearing forces.

The compositions of the present invention or slurries or dispersions comprising such compositions may be used as an ink to be deposited on any substrate used for gas separation. The adsorbent carbon material is used for the gas separation purpose and the fluorinated polymer serves as a binder to fix the activated carbon to the substrate. The respective bond is stable under harsh conditions and resilient under thermal/moisturing cycles.

Particularly preferably, the compositions, slurries, dispersions or casting compositions in accordance with the present invention can be used for the separation, respectively adsorption, of carbon dioxide from fluid mixtures.

The substrates coated with the combination of fluorinated polymer and adsorbent carbon material in the compositions of the present invention can be used in temperature swing adsorption processes as well as pressure swing adsorption processes. Both such processes are known to the skilled person as suitable gas separation methods.

In pressure swing adsorption (PSA) gas species are adsorbed onto a a sorbent (comprising, consisting essentially of or consisting of the adsorbent carbon material) at relatively high pressure thereby removing the species from the fluid stream. In a regenerative pressure swing adsorption process, reducing the absolute pressure (e.g. applying a vacuum) to the loaded adsorbent bed or reducing the partial pressure of the adsorbed species in the gas phase by sweeping a lower concentration purge gas through the bed regenerates the sorbent.

In temperature swing adsorption processes (TSA) species are adsorbed at low temperatures where the loading capacity is relatively high and are thereafter, in the regeneration step desorbed at higher temperature thus recovering sorption capacity for subsequent additional separation cycles.

The adsorbent carbon material in the compositions according to the present invention, often shows an electrical conductivity, which property may be used advantageously in temperature swing gas separation technologies that include an electrical heat regeneration step, such as ohmic, capacitive or inductive current dissipation to heat the material.

A further embodiment of the present invention is thus a process for the separation of one or more component or components of a fluid mixture from the fluid mixture which process comprises adsorption of at least one component of the fluid mixture at a temperature $T_1$ and a regeneration step at a temperature $T_2$ (at which the adsorbed component is desorbed again to allow reuse) which is higher than $T_1$ wherein the heating from $T_1$ to $T_2$ is achieved through ohmic, capacitive or inductive current dissipation, i.e. through the application of electrical power in which an adsorbent system is used which comprises a substrate material comprising a surface coating obtained by casting a casting composition comprising a slurry or dispersion comprising the compositions of the present invention onto the surface of the substrate and subsequent removal of the solvent.

Other known adsorption methods for the separation of gases are vacuum swing adsorption systems or moving bed contact systems.

Respective methods and systems are know to the skilled person so that no further details need to be given here.

Carbon dioxide capture systems comprising a pressure swing, temperature swing, vacuum swing system or moving bed contacting system constitute a further embodiment of the present invention.

Respective processes are known to the skilled person and thus no further details need to be given here.

The compositions of the present invention, when used for gas separation purposes, in particular after coating the compositions on substrates, show a good degree of $CO_2$ adsorption.

EXAMPLE 1

Adsorbent Carbon Material

The activated carbon material used in the working examples was a Brightblack® carbon supplied by ATMI which was obtained by grinding the native material with a particle size of 200 microns to a particle size of 7 microns. The product had a BET specific surface area of 1050 m²/g, a pore volume of 0.40 ml/g and the pore volume consisted quantitatively (greater 99%) of pores with a radius of 2 nm or less.

The elemental analysis yielded the following result:
C 888 g/kg
H 8 g/kg
N less than 5 g/kg
O 30 g/kg

EXAMPLE 2

Slurries Based on Activated Carbon Described Before and PVDF Latex as Binder

To 10 g of a 5 wt % solution of a vinylidene fluoride polymer comprising acrylate groups and obtained as described in Example 1 of WO 2008/129041, 4.5 g of the adsorbent carbon material described in Example 1 was added under magnetic stirring at room temperature. 2 ml of NMP were added to regulate the viscosity. A slurry with a good viscosity for casting was obtained comprising vinylidene fluoride polymer and adsorbent carbon material in the weight ratio of 10:90.

EXAMPLE 3

Example 2 was repeated but with a weight ratio of vinylidene fluoride polymer to adsorbent carbon material of 20:80, i.e. the amount of adsorbent carbon materials was 2 g instead of 4.5 g.

EXAMPLE 4

The slurries obtained were casted on the grey side of a Sigracet® GDL25BC support (obtained from SGL Carbon)

using a doctor blade with a gap opening of 250 micrometers. The resulting film was dried at 110° C. overnight to evaporate the NMP. The slurry with the 20:80 weight ratio showed a better adhesion than the slurry with a 10:90 weight ratio and was used for further performance investigations.

The resistivity of the coated GDL25BC was measured using the van der Pauw method and was determined to 0.0197 Ω*cm (the GDL25BC support without coating had a resistivity of 0.0216 Ω*cm under the same conditions).

The thickness of the coating was determined to be approximately 20 μm and the quantity of adsorbent carbon material was 11 g/m² after one coating step and 20.5 g/m² after two coating steps.

EXAMPLE 5

Carbon Dioxide Adsorption

Figure 1:
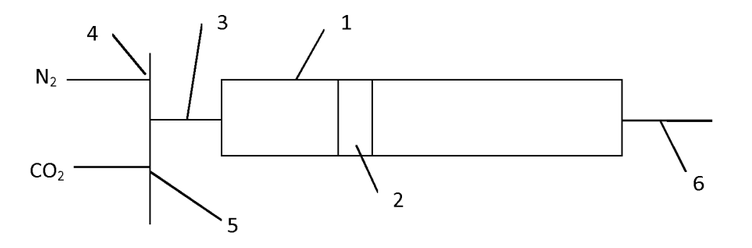
FIG. 1 shows a device as used in Example 5 containing substrates coated with the compositions in accordance with the invention. A tubular container 1 comprising the substrate 2 coated with the composition as described in Example 5 is equipped with a inlet line 3 through which a fluid (gas) stream is introduced into container 1. Through two 3-way valves 4 respectively 5, nitrogen and carbon dioxide, in the respective amounts, are fed into inlet line 3. The fluid stream passes through the adsorbent substrate 2 and leaves container 1 through outlet line 6 to the suitable analytical instrumentation needed for analysis.

The prototype for substrates characterization was fabricated with transparent cells in which substrates were assembled in parallel (assembly shown in FIG. 1). The space between two substrates used for the gas circulation was adapted to assume laminar conditions in the transparent cell.

Three different concentrations (15, 50 and 100%) of carbon dioxide diluted in nitrogen were used. The concentration was precisely controlled by mass flow controllers. Three different gas flow rates of 61, 122 and 245 ml/min were used and an argon flow (5 ml/min) was added to the gas mixture which played the role of a buffer gas. The signals of m/z=40, 28 and 44 respectively corresponding to Ar, $N_2$ and $CO_2$ were continuously recorded by mass spectrometry (Agilent MSD5975, scan rate=12.7 Hz).

The procedure for the analysis of the adsorption process was as follows:

A $N_2$ flow was injected into the cell containing substrate layers during 60 seconds in order to potentially desorb molecules previously adsorbed on the activated carbon particles.

3-way valves were automatically switched by using the Labview program to inject carbon dioxide and Ar during 2 seconds. Thereafter the nitrogen flow was maintained for 300 seconds in order to measure the non-adsorbed carbon dioxide quantity. Finally, carbon dioxide was injected in order to precisely estimate the time detection of the carbon dioxide signal for each flow rate and concentration studied.

For each experiment, a blank was performed with a transparent cell containing glass microbeads to simulate the presence of coated substrates but with no $CO_2$ adsorption properties. The interest of this blank was to correlate the quantity of $CO_2$ injected with the intensity detected by mass spectrometry.

A full factorial design has been created with three levels of $CO_2$ concentration and three levels of gas flow rate leading to the realization of 18 experiments (9 experiments with coated substrates and 9 experiments with blank containing glass microbeads). For each experiment, we calculated the ratio between the $CO_2$ peak intensity and Ar peak intensity. The difference between the $CO_2$/Ar intensity ratio corresponding to the blank and the $CO_2$/Ar intensity ratio corresponding to the sample is related to the quantity of $CO_2$ adsorbed. Considering the flow rate value, the percentage of $CO_2$ in the gas inlet and the injection time of 2 seconds, we could calculate the total quantity of $CO_2$ adsorbed, and finally, the adsorption capacity (%) can be estimated for each experiment (Table 1).

TABLE 1

| Exp. | Flow rate (ml/min) | % $CO_2$ in $N_2$ | Adsorbed quantity in mg | % adsorption |
|---|---|---|---|---|
| 1 | 61 | 15 | 0.023 | 41.64 |
| 2 | 61 | 50 | 0.067 | 36..89 |
| 3 | 61 | 100 | 0.125 | 34.75 |
| 4 | 122 | 15 | 0.034 | 30.97 |
| 5 | 122 | 50 | 0.099 | 27.29 |
| 6 | 122 | 100 | 0.195 | 27.05 |
| 7 | 245 | 15 | 0.057 | 26.10 |
| 8 | 245 | 50 | 0.0178 | 24.55 |
| 9 | 245 | 100 | 0.324 | 23.00 |

The results show an adsorption capacity which significantly depends on the flow rate while the effect of the concentration of carbon dioxide in the stream was much smaller.

All patents, patent applications and publications which are cited herein are incorporated herein by reference. However, should the disclosure of any such patents, patent applications and publications conflict with the description of the present application to the extent that it may render a term unclear, the present description shall take precedence.

The invention claimed is:

1. A composition used for gas separation or gas purification through adsorption methods, the composition consisting essentially of:
   a) a polymer comprising recurring units derived from vinylidene fluoride monomer and at least one monomer carrying at least one functional group selected from carboxyl groups, ester groups and hydroxyl groups, and
   b) a microporous adsorbent carbon material having a specific surface area (BET) of from 900 to 1800 m²/g, a pore volume in the range of from 0.2 to 0.55 ml/g, at least 60% of said pore volume being formed by micropores having a pore radius of 2 nm or less.

2. The composition in accordance with claim 1 wherein the polymer comprises from 0.02 to 20 mol % of recurring units derived from the monomer carrying at least one functional group selected from carboxyl groups, ester groups and hydroxyl groups.

3. The composition in accordance with claim 1 wherein at least 40 mol % of the recurring units derived from the monomer carrying at least one functional group selected from carboxyl groups, ester groups and hydroxyl groups are randomly distributed.

4. The composition in accordance with claim 1 wherein the monomer carrying at least one functional group is selected from (meth)acrylic acid monomers of formula 1

(1)

wherein each of $R_1$, $R_2$, and $R_3$ which may be the same or different, independently represents a hydrogen atom or a $C_1$-$C_3$ hydrocarbon group and $R_4$ is a hydrogen or a $C_1$-$C_5$ hydrocarbon moiety comprising at least one hydroxyl group.

5. The composition in accordance with claim 1 wherein the microporous adsorbent carbon material has a specific surface area (BET) of at least 900 m²/g.

6. The composition in accordance with claim 1 wherein the microporous adsorbent carbon material is a pyrolyzate of a vinylidene chloride polymer.

7. A slurry or liquid dispersion comprising the composition in accordance with claim 1.

8. The slurry or dispersion in accordance with claim 7 comprising an aqueous or an organic solvent or mixtures thereof.

9. A casting composition comprising the slurry or dispersion in accordance with claim 7.

10. An adsorbent system comprising a substrate material comprising a surface coating obtained by casting the casting composition in accordance with claim 9 onto the surface of the substrate material and subsequent removal of the solvent.

11. A carbon dioxide capture system, comprising the adsorbent system in accordance with claim 10.

12. A process for the separation of one or more component or components of a fluid mixture from the fluid mixture, which process comprises adsorption of at least one component of the fluid mixture at a temperature $T_1$ and a regeneration step at a temperature $T_2$ which is higher than $T_1$ wherein the heating from $T_1$ to $T_2$ is achieved through ohmic, capacitive or inductive current dissipation in which an adsorbent system is used which comprises a substrate material comprising a surface coating obtained by casting the casting composition in accordance with claim 9 onto the surface of the substrate and subsequent removal of the solvent.

13. A process for separating a component of a fluid mixture from other components of the fluid mixture, the process comprising using the slurry or dispersion in accordance with claim 7.

14. A process for separating a component of a fluid mixture from other components of the fluid mixture, the process comprising using the coating composition in accordance with claim 1.

15. The process in accordance with claim 14 wherein the component to be separated is carbon dioxide.

16. A carbon dioxide capture system, comprising the composition in accordance with claim 1.

17. The carbon dioxide capture system in accordance with claim 16 comprising a pressure swing, temperature swing, vacuum swing system or moving bed contacting system.

* * * * *